United States Patent
Nakatani

(10) Patent No.: US 12,277,765 B2
(45) Date of Patent: Apr. 15, 2025

(54) SELECTIVE ANALYTIC APPLICATIONS USING METADATA ELEMENTS

(71) Applicant: The ADT Security Corporation, Boca Raton, FL (US)

(72) Inventor: Thomas Nakatani, Aurora, CO (US)

(73) Assignee: The ADT Security Corporation, Boca Raton, FL (US)

(*) Notice: Subject to any disclaimer, the term of this patent is extended or adjusted under 35 U.S.C. 154(b) by 68 days.

(21) Appl. No.: 18/345,633

(22) Filed: Jun. 30, 2023

(65) Prior Publication Data

US 2025/0005927 A1    Jan. 2, 2025

(51) Int. Cl.
*G06V 20/52* (2022.01)
*G06V 20/40* (2022.01)

(52) U.S. Cl.
CPC .............. *G06V 20/44* (2022.01); *G06V 20/52* (2022.01)

(58) Field of Classification Search
CPC ................................ G06V 20/44; G06V 20/52
See application file for complete search history.

(56) References Cited

U.S. PATENT DOCUMENTS

| | | | |
|---|---|---|---|
| 10,936,974 B2 | 3/2021 | Chaudhari et al. | |
| 11,165,954 B1 | 11/2021 | Beach et al. | |
| 11,250,344 B2 * | 2/2022 | Maurya | G06F 3/048 |
| 11,361,202 B2 * | 6/2022 | McCarson | G06V 20/188 |
| 11,620,528 B2 | 4/2023 | Ryan et al. | |
| 2016/0292591 A1 * | 10/2016 | Guirguis | G06N 20/20 |
| 2017/0084295 A1 * | 3/2017 | Tsiartas | G10L 17/08 |
| 2023/0048497 A1 | 2/2023 | Choi et al. | |
| 2023/0089504 A1 * | 3/2023 | Khanna | G06V 10/771 706/20 |
| 2023/0351070 A1 * | 11/2023 | Hartley | G06Q 30/018 |
| 2023/0362335 A1 * | 11/2023 | Kastner | G06T 7/70 |
| 2024/0242193 A1 * | 7/2024 | Steiner | G06Q 20/208 |

OTHER PUBLICATIONS

V.S. Marco et al.; Optimizing Deep Learning Inference on Embedded Systems Through Adaptive Model Selection; ACM Transactions on Embedded Computing Systems, vol. 1, No. 1, Article 1; Jan. 2019, consisting of 27-pages.

* cited by examiner

*Primary Examiner* — Jonathan R Messmore
(74) *Attorney, Agent, or Firm* — Weisberg I.P. Law, P.A.

(57) ABSTRACT

A method in a premises device is provided, where the premises device is configured with a plurality of analytics models and located in a premises environment. The method includes generating a dataset comprising surveillance data associated with a premises environment in which the premises device operates, determining metadata associated with the dataset, determining, for each analytics model of the plurality of analytics models, a corresponding predicted performance score based at least in part on the metadata, selecting a highest-scoring analytics model of the plurality of analytics models based at least in part on the corresponding predicted performance score, and analyzing the dataset using the highest-scoring analytics model to generate a prediction.

20 Claims, 4 Drawing Sheets

SELECTIVE ANALYTIC APPLICATIONS USING METADATA ELEMENTS

TECHNICAL FIELD

The present disclosure is generally related to premises monitoring and to methods and systems for selective analytic applications using metadata elements, e.g., for a premises monitoring system.

BACKGROUND

Premises monitoring systems may include multiple devices of various types, including sensors, detectors, video cameras, etc., that are used for monitoring premises. The data generated by these various types of devices may be communicated to a system control device to initiate an event alarm based on the data.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate and modifications and variations are possible to achieve the electrical and data communication.

In some embodiments described herein, the term "coupled," "connected," and the like, may be used herein to indicate a connection, although not necessarily directly, and may include wired and/or wireless connections.

Figure 1:
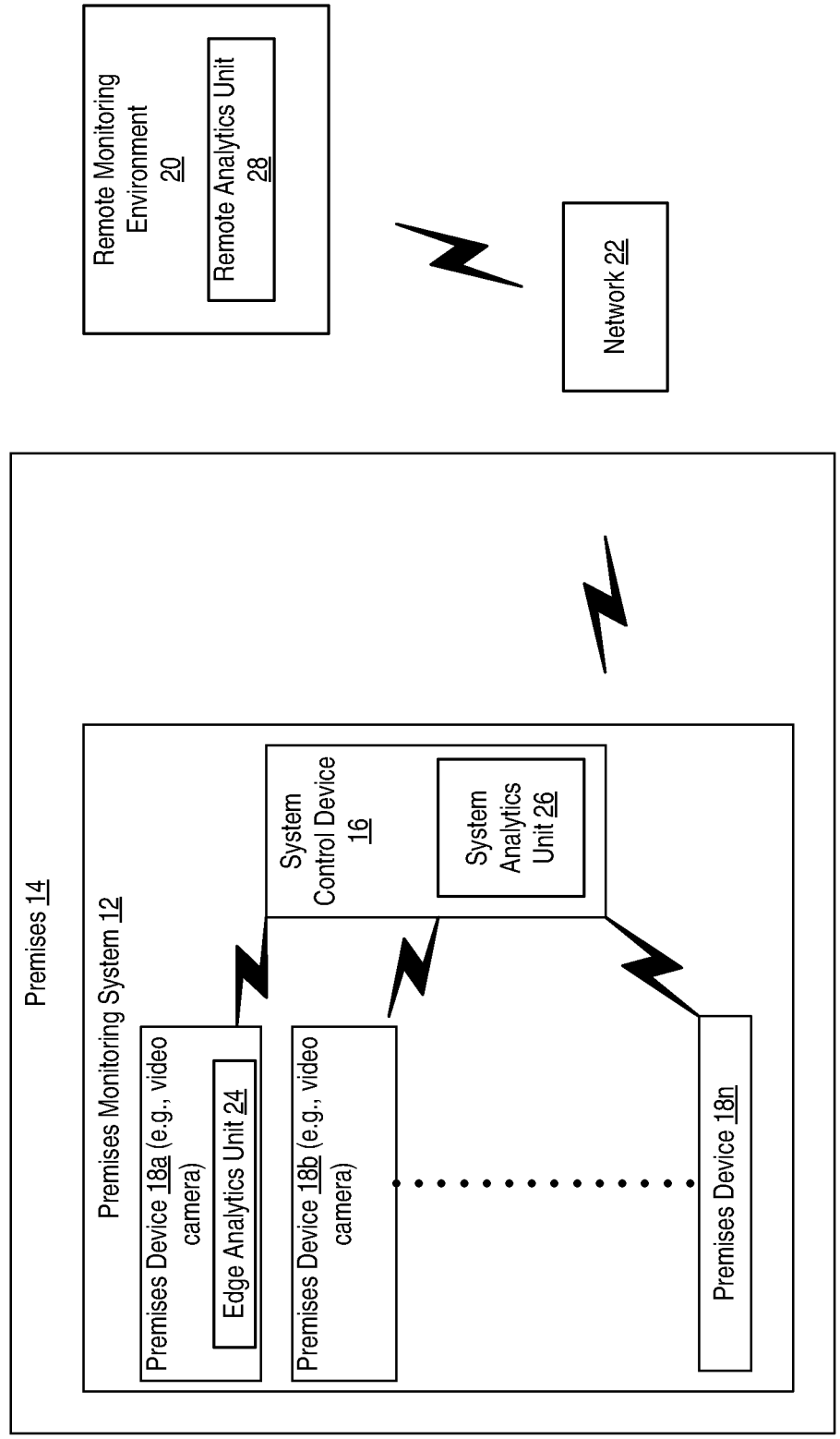
FIG. 1 is a diagram of an example system comprising a premises monitoring system according to some embodiments of the present disclosure.

Referring now to the drawing figures in which like reference designators refer to like elements there is shown in FIG. 1 a system designated generally as "10." System 10 may include premises monitoring system 12 for monitoring premises 14. According to various embodiments, the premises monitoring system 12 may be, for example, a burglary alarm system, an alarm system for monitoring the safety of life and/or property, a home automation system, and/or other types of premises monitoring systems 12. Premises monitoring system 12 includes and/or is associated with one or more system control devices 16, and one or more premises devices 18a to 18n (collectively referred to as "premises devices 18"). System control device 16 may be configured for controlling and/or managing the premises monitoring system 12. Premises devices 18 may be in communication with system control device 16, e.g., via one or more wired and/or wireless connections. System control device 16 and/or one or more premises devices 18 may be in communication with remote monitoring environment 20 via one or more networks 22. According to various embodiments, the premises monitoring system 12 may be, for example, a premises security system and/or a premises automation system.

System control device 16 may provide one or more of management functions, monitoring functions, analysis functions, control functions such as power management, premises device management and alarm management and/or analysis, among other functions to premises monitoring system 12. For example, system control device 16 may comprise one or more of a hub, a security control panel, a premises control panel, an access point, a base station, etc. In particular, system control device 16 may manage one or more life safety or premises automation features. Life safety features may correspond to monitoring system functions and settings associated with premises conditions that may result in life-threatening harm to a person, such as carbon monoxide detection and intrusion detection (e.g., video detection, sensor detection, etc.). Premises automation features may correspond to monitoring system functions and settings associated with video capturing devices and non-life-threatening conditions of the premises, such as lighting and thermostat functions. In one or more embodiments, system control device 16 may receive captured media from one or more premises devices via a wired and/or wireless connection, as described herein.

System control device 16 may communicate with network 22 via one or more communication links. In particular, the communications links may be broadband communication links, such as a wired cable modem or Ethernet communication link, and a digital cellular communication link, such as a long term evolution (LTE), 5G and/or 6G based link, among other broadband communication links. A broadband link in various embodiments may be a communication link other than a plain old telephone service (POTS) line. An Ethernet communication link may be an IEEE 802.3 or 802.11 based communication link. Network 22 may be a wide area network, local area network, wireless local network and metropolitan area network, among other networks. Network 22 provides communications among one or more of system control device 16, and/or remote monitoring environment 20.

Premises device 18 may include sensors, device management apparatuses, image capture devices, audio capture devices, life safety devices, premises automation devices, and/or other devices. For example, the types of sensors may include various life safety-related sensors, such as motion sensors, fire sensors, carbon monoxide sensors, flooding sensors and contact sensors, among other sensor types. A device management apparatus may include, for example, a device configured to adjust at least one premises setting, such as lighting, temperature, energy usage, door lock and power settings, among other settings associated with the premises or devices on the premises. Image capture devices may include still image cameras and/or video cameras, among other image capture devices. Premises device 18 may be configured for sensing one or more aspects of the environment, such as an open or closed door, open or closed window, motion, heat, smoke, gas, sounds, images, people, animals, objects, etc.

System 10 may also include a remote monitoring environment 20 in communication with premises monitoring system 12 via network 22. Remote monitoring environment 20 may be configured to perform certain monitoring, configuration and/or control functions associated with system 10. For example, remote monitoring environment 20 may receive an alarm event notification from the system control device 16 where the alarm event is generated by the system control device 16 based on the media received from the premises devices 18. In one or more embodiments, remote monitoring environment 20 may perform various life safety response processes in notifying the owner of the premises, determining whether an actual alarm event is occurring at the premises, and notifying any appropriate response agency (e.g., police, fire, emergency response, other interested parties such as premises owners, etc.).

In one or more embodiments, one or more premises devices 18 may comprise an edge analytics unit 24 configured for selectively applying one or more analytics models, statistical models, machine learning (ML) models, and/or artificial intelligence (AI) models for analyzing data collected at and/or generated by the premises device 18 or other premises devices 18. Such edge analytics units 24 may perform analytics functionality, such as object or activity detection, locally on the premises device 18.

In one or more embodiments, system control device 16 may comprise a system analytics unit 26 configured for selectively applying one or more analytics models, statistical models, ML models, and/or AI models for analyzing data collected at and/or generated by the system control device 16 and/or one or more premises devices 18. The system analytics unit 26 may perform analytics functionality, such as object or activity detection, locally on the system analytics unit 26.

In one or more embodiments, remote monitoring environment 20 may comprise a remote analytics unit 28 configured for selectively applying one or more analytics models, statistical models, ML models, and/or AI models for analyzing data collected at and/or generated by the remote monitoring environment 20.

Example implementations, in accordance with embodiments of system 10 discussed in the preceding paragraphs will now be described with reference to FIG. 2.

Premises device 18 comprises hardware 30. The hardware 30 may include sensor hardware 32, communication interface 34, and processing circuitry 36. The processing circuitry 36 may include a processor 38 and a memory 40. In addition to or instead of a processor 38, the processing circuitry 36 may comprise integrated circuitry for processing and/or control, e.g., one or more processors and/or processor cores, field programmable gate arrays (FPGAs), and/or application specific integrated circuits (ASICs) adapted to execute instructions. The processor 38 may be configured to access (e.g., write to and/or read from) the memory 40, which may comprise any kind of volatile and/or nonvolatile memory, e.g., cache, buffer memory, random access memory (RAM), read-only memory (ROM), optical memory, and/or erasable programmable read-only memory (EPROM). Further, memory 40 may be configured as a storage device. The processing circuitry 36 may be configured to perform various functionality described herein. For example, computer instructions may be stored in memory 40 and/or another computer-readable medium that, when executed by the processor 38, cause the processor 38 to perform various functionality.

Hardware 30 of premises device 18 may include sensor hardware 32, such as one or more of video capture elements, audio capture elements, image capture elements, smoke detectors, temperature detectors, weather detectors, air quality detectors, water/flood detectors, chemical/gas detectors, motion detectors, door sensors, window sensors, etc. In one or more embodiments, sensor hardware 32 is configured to capture video (e.g., premises device 18 may be a video camera). Hardware 32 may include communication interface 34 enabling premises device 18 to communicate with any component or device of system 10. For example, communication interface 34 may be configured for establishing and maintaining at least a wireless or wired connection with any component or device of system 10, such as with system control device 16 and/or remote monitoring environment 20. The communication interface 34 may be formed as or may include, for example, one or more radio frequency (RF) transmitters, one or more RF receivers, and/or one or more RF transceivers.

Premises device 18 further has software 42 (which may include one or more software applications) stored internally in, for example, memory 40, or stored in external memory (e.g., database, storage array, network storage device, etc.) accessible by the premises device 18 via an external connection. Software 42 may include any software or program configured to perform the steps or processes of the present disclosure, e.g., causing edge analytics unit 24 to analyze data/video/media/etc. captured by sensor hardware 32, and/or to transmit such data/video/media to one or more elements of system 10, such as system control device 16 and/or remote monitoring environment 20, and/or to transmit the results of analysis to one or more elements of system 10.

The processing circuitry 36 may be configured to control any of methods and/or processes described herein and/or to cause such methods, and/or processes to be performed, e.g., by premises device 18. Processor 38 corresponds to one or more processors 38 for performing premises device 18 functions described herein. The memory 40 is configured to store data and/or files such as premises system data and/or other information/data. In some embodiments, the software 42 may include instructions that, when executed by the processor 38 and/or processing circuitry 36, causes the processor 38 and/or processing circuitry 36 to perform the processes described herein with respect to premises device 18. For example, processing circuitry 36 of premises device 18 may include edge analytics unit 24, which may be configured to perform any of the processes, steps, or functions described herein, e.g., analyzing data/video/media/etc. captured by sensor hardware 32, and/or to transmit such data/video/media to one or more elements of system 10, such as system control device 16 and/or remote monitoring environment 20, and/or to transmit the results of analysis to one or more elements of system 10.

Figure 2:
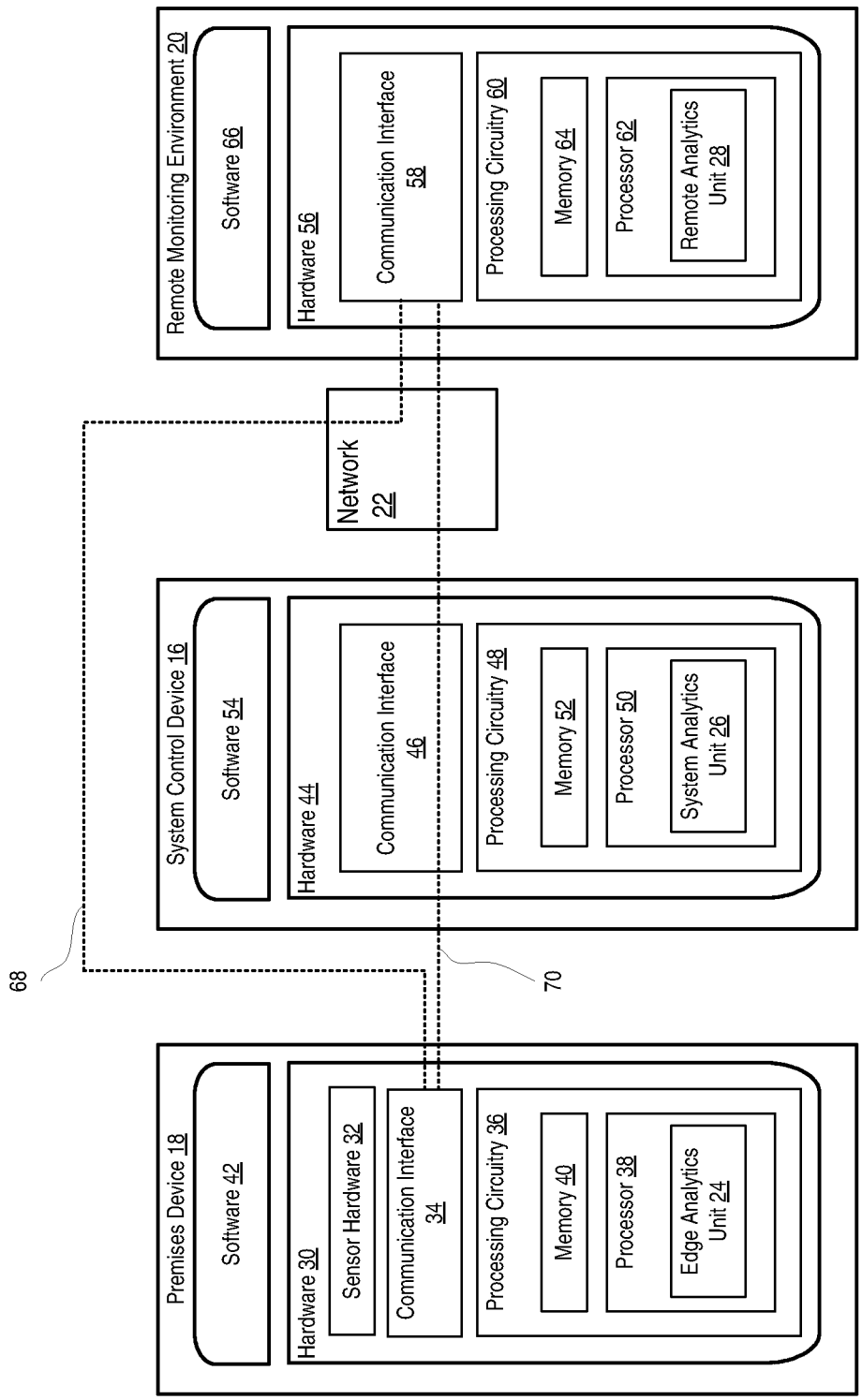
FIG. 2 is a diagram illustrating an example premises device and an example analytics device, according to some embodiments of the present disclosure.

Still referring to FIG. 2, system 10 further comprises system control device 16. System control device 16 comprises hardware 44. The hardware 44 may include communication interface 46 and processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores, FPGAs, and/or ASICs adapted to execute instructions. The processor 50 may be configured to access (e.g., write to and/or read from) the memory 52, which may comprise any kind of volatile and/or nonvolatile memory, e.g., cache, buffer memory, RAM, ROM, optical memory, and/or EPROM. Further, memory 52 may be configured as a storage device.

Hardware 44 may include communication interface 46 enabling system control device 16 to communicate with any component or device of system 10. For example, communication interface 46 may be configured for establishing and maintaining at least a wireless or wired connection with any component or device of system 10, such as with premises devices 18 and/or remote monitoring environment 20. The communication interface 46 may be formed as or may include, for example, one or more RF transmitters, one or more RF receivers, and/or one or more RF transceivers.

System control device 16 further has software 54 (which may include one or more software applications) stored internally in, for example, memory 52, or stored in external memory (e.g., database, storage array, network storage device, etc.) accessible by the system control device 16 via an external connection. Software 54 may include any software or program configured to perform the steps or processes of the present disclosure, e.g., causing system analytics unit 26 to analyze data/video/media/etc. captured by premises device(s) 18 and received, e.g., via communication interface 46, and/or to transmit and/or forward such data, video and/or media to one or more elements of system 10, such as remote monitoring environment 20, and/or to transmit the results of analysis to one or more elements of system 10.

The processing circuitry 48 may be configured to control any of methods and/or processes described herein and/or to cause such methods, and/or processes to be performed, e.g., by system control device 16. Processor 50 corresponds to one or more processors 50 for performing system control device 16 functions described herein. The memory 52 is configured to store data and/or files such as premises system data and/or other information/data. In some embodiments, the software 54 may include instructions that, when executed by the processor 50 and/or processing circuitry 48, causes the processor 50 and/or processing circuitry 48 to perform the processes described herein with respect to system control device 16. For example, processing circuitry 48 of system control device 16 may include system analytics unit 26, which may be configured to perform any of the processes, steps, or functions described herein, e.g., analyzing data, video, media, etc. captured by one or more premises devices 18 and received via communication interface 46, and/or to transmit/forward such data, video and/or media to one or more elements of system 10, such as remote monitoring environment 20, and/or to transmit the results of analysis to one or more elements of system 10.

Still referring to FIG. 2, system 10 further comprises remote monitoring environment 20, which may be a cloud-based and/or virtual and/or server-based computing environment for managing, analyzing, controlling, etc., one or more of premises device(s) 18 and/or system control device 16. Remote monitoring environment 20 comprises hardware 56. The hardware 56 may include communication interface 58 and processing circuitry 60. The processing circuitry 60 may include a processor 62 and a memory 64. In particular, in addition to or instead of a processor, such as a central processing unit, and memory, the processing circuitry 60 may comprise integrated circuitry for processing and/or control, e.g., one or more processors and/or processor cores, FPGAs, and/or ASICs adapted to execute instructions. The processor 62 may be configured to access (e.g., write to and/or read from) the memory 64, which may comprise any kind of volatile and/or nonvolatile memory, e.g., cache, buffer memory, RAM, ROM, optical memory, and/or EPROM. Further, memory 64 may be configured as a storage device.

Hardware 56 may include communication interface 58 enabling remote monitoring environment 20 to communicate with any component or device of system 10. For example, communication interface 58 may be configured for establishing and maintaining at least a wireless or wired connection with any component or device of system 10, such as with system control device 16 and/or premises devices 18. The communication interface 58 may be formed as or may include, for example, one or more RF transmitters, one or more RF receivers, and/or one or more RF transceivers. The communication interface 58 may communicate with premises device 18 and/or system control device via one or more network 22. For example, communication interface 34 of premises device 18 may communicate via communication link 68 with network 22 and/or communication interface 58 of remote monitoring environment 20. As another example, communication interface 34 of premises device 18, communication interface 46 of system control device 16, and/or communication interface 58 of remote monitoring environment 20 may communicate with one another via communication link 70, which may, in some embodiments, at least partially pass through network 22.

Remote monitoring environment 20 further has software 66 (which may include one or more software applications) stored internally in, for example, memory 64, or stored in external memory (e.g., database, storage array, network storage device, etc.) accessible by the remote monitoring environment 20 via an external connection. Software 66 may include any software or program configured to perform the steps or processes of the present disclosure, e.g., causing remote analytics unit 28 to analyze data, video, media/etc. captured by premises device(s) 18 and received, e.g., via communication interface 58, and/or to transmit the results of analysis to one or more elements of system 10.

The processing circuitry 60 may be configured to control any of methods and/or processes described herein and/or to cause such methods, and/or processes to be performed, e.g., by remote monitoring environment 20. Processor 62 corresponds to one or more processors 62 for performing remote monitoring environment 20 functions described herein. The memory 64 is configured to store data and/or files such as premises system data and/or other information/data. In some embodiments, the software 66 may include instructions that, when executed by the processor 62 and/or processing circuitry 60, causes the processor 62 and/or processing circuitry 60 to perform the processes described herein with respect to remote monitoring environment 20. For example, processing circuitry 60 of remote monitoring environment 20 may include remote analytics unit 28, which may be configured to perform any of the processes, steps, or functions described herein, e.g., causing remote analytics unit 28 to analyze data, video, media, etc. captured by premises device(s) 18 and received, e.g., via communication interface 58, and/or to transmit the results of analysis to one or more elements of system 10.

Figure 3:
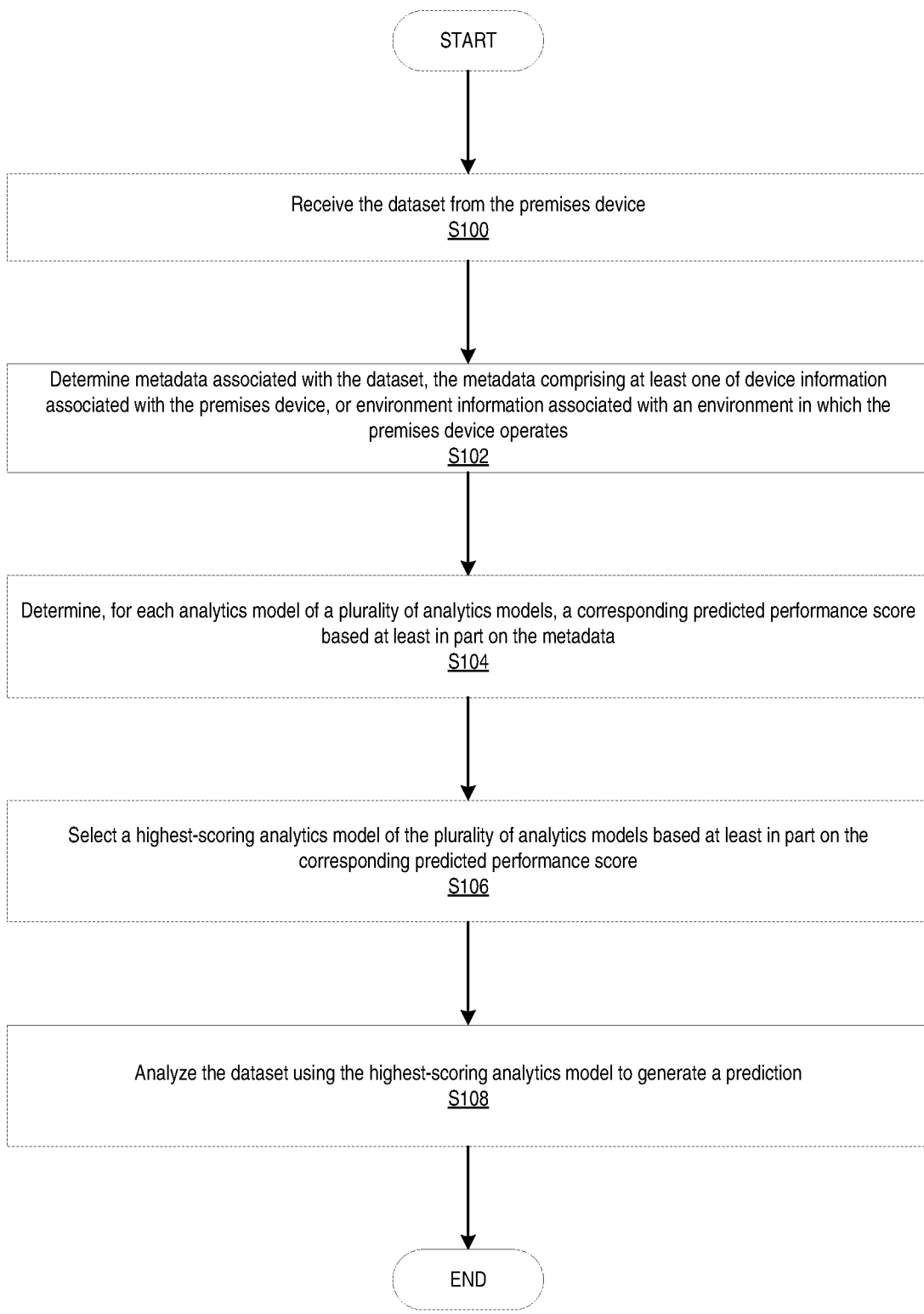
FIG. 3 is a flowchart of an example process performed in the premises monitoring system of FIG. 1.

FIG. 3 is a flowchart of an example process of system 10 according to some embodiments of the present disclosure. One or more blocks described herein may be performed by one or more elements of premises device 18, such as by one or more of processing circuitry 36 (including the edge analytics unit 24) and/or processor 38 and/or communication interface 34. One or more blocks described herein may be performed by one or more elements of system control device 16, such as by one or more of processing circuitry 48 (including system analytics unit 26) and/or processor 50 and/or communication interface 46. One or more blocks described herein may be performed by one or more elements of remote monitoring environment 20, such as by one or more of processing circuitry 60 (including the remote analytics unit 28) and/or processor 62 and/or communication interface 58. One or more of the premises device 18, system control device 16, and remote monitoring environment 20 may be configured with a plurality of analytics models (e.g., stored in memory 40, memory 52, and/or memory 64).

System 10 comprises at least one processor (e.g., processor 38, processor 50, and/or processor 62), and at least one computer-readable medium (e.g., memory 40, memory 52, and/or memory 64) storing a plurality of instructions (e.g., software 42, software 54, and/or software 66) that, when executed by the at least one processor, causes the at least one processor to receive (Block S100) a dataset from a premises device 18, to determine (Block S102) metadata associated with the dataset, the metadata comprising at least one of device information associated with the premises device 18, and/or environment information associated with an environment in which the premises device 18 operates. For example, the metadata may be received from premises device 18, and/or may be determined by system control device 16 and/or remote monitoring environment 20 based on, e.g., the dataset, and/or other stored and/or received information about premises device 18 and/or the environment (e.g., weather data, location data, premises device 18 model data, premises device 18 capability data, etc.).

The plurality of instructions (e.g., software 42, software 54, and/or software 66), when executed by the at least one processor, further causes the at least one processor to determine (Block S104), for each analytics model of a plurality of analytics models (e.g., stored in one or more of memory 40, memory 52, and/or memory 64, and/or received via communication interface 34, communication interface 46, and/or communication interface 58), a corresponding predicted performance score based at least in part on the metadata, to select (Block S106) a highest-scoring analytics model of the plurality of analytics models based at least in part on the corresponding predicted performance score, and to analyze (Block S108) the dataset using the highest-scoring analytics model to generate a prediction. For example, where the highest-scoring analytics model is an ML model, the dataset, or a portion thereof (e.g., a sampling, a slice, etc.) is input into the ML model. In some cases, the dataset may be one or more of preprocessed, reformatted, sampled, flattened, etc., to enable the ML model to process the dataset. In some embodiments, the output of the ML model may be a prediction which is used locally to perform some premises device 18 action, system control device 16 action, and/or remote monitoring environment 20 action (e.g., sounding an alarm, entering into a heightened alert state, powering on, waking up, signaling other premises devices 18 to wake up, etc.). In some embodiments, the output of the ML model may be a prediction which is transmitted to another element in system 10, e.g., system control device 16, premises device(s) 18, and/or remote monitoring environment 20, enabling the other element to take further action based on the prediction. In some embodiments, any of the above steps may be performed alternatively by one or more of premises device 18, system control device 16, and/or remote monitoring environment 20.

According to one or more embodiments, the prediction comprises a predicted likelihood of at least one of a security breach in the premises environment, a crime event in the premises environment, a fire event in the premises environment, a flood event in the premises environment, a health emergency event in the premises environment, or an equipment malfunction event in the premises environment.

According to one or more embodiments, the device information comprises at least one of a model of the premises device 18, a type of the premises device 18, a sensor resolution of the premises device 18, a frame rate of the premises device 18, a processing capability of the premises device 18, a temperature of the premises device 18, or a power level of the premises device 18.

According to one or more embodiments, the environment information comprises at least one of a visibility condition of the premises environment, a temperature of the premises environment, a humidity level of the premises environment, a weather condition of the premises environment, a location of the premises device 18 in the premises environment, or a time of day associated with the dataset.

According to one or more embodiments, the plurality of instructions, when executed by the at least one processor, further causes the at least one processor to determine, for each analytics model of the plurality of analytics models, the corresponding predicted performance score by receiving an historical dataset comprising historical premises device data and a plurality of corresponding labels, receiving (or, in some embodiments, determining) a metadata dataset associated with the historical premises device data, determining, for each analytics model of the plurality of analytics models, a plurality of accuracy scores based at least in part on the historical premises device data, the plurality of corresponding labels, and the metadata dataset, where each of the plurality of accuracy scores is associated with a datapoint in the metadata dataset, and generating, for each analytics model of the plurality of analytics models, a data structure comprising the metadata dataset and the associated plurality of accuracy scores. For example, Table 1 and Table 2 described below may represent such a data structure or a collection of such data structures.

According to one or more embodiments, the historical premises device data and corresponding labels are determined in at least one of a simulated testing environment, or a prior deployment of the premises device (e.g., a real-world deployment).

Figure 4:
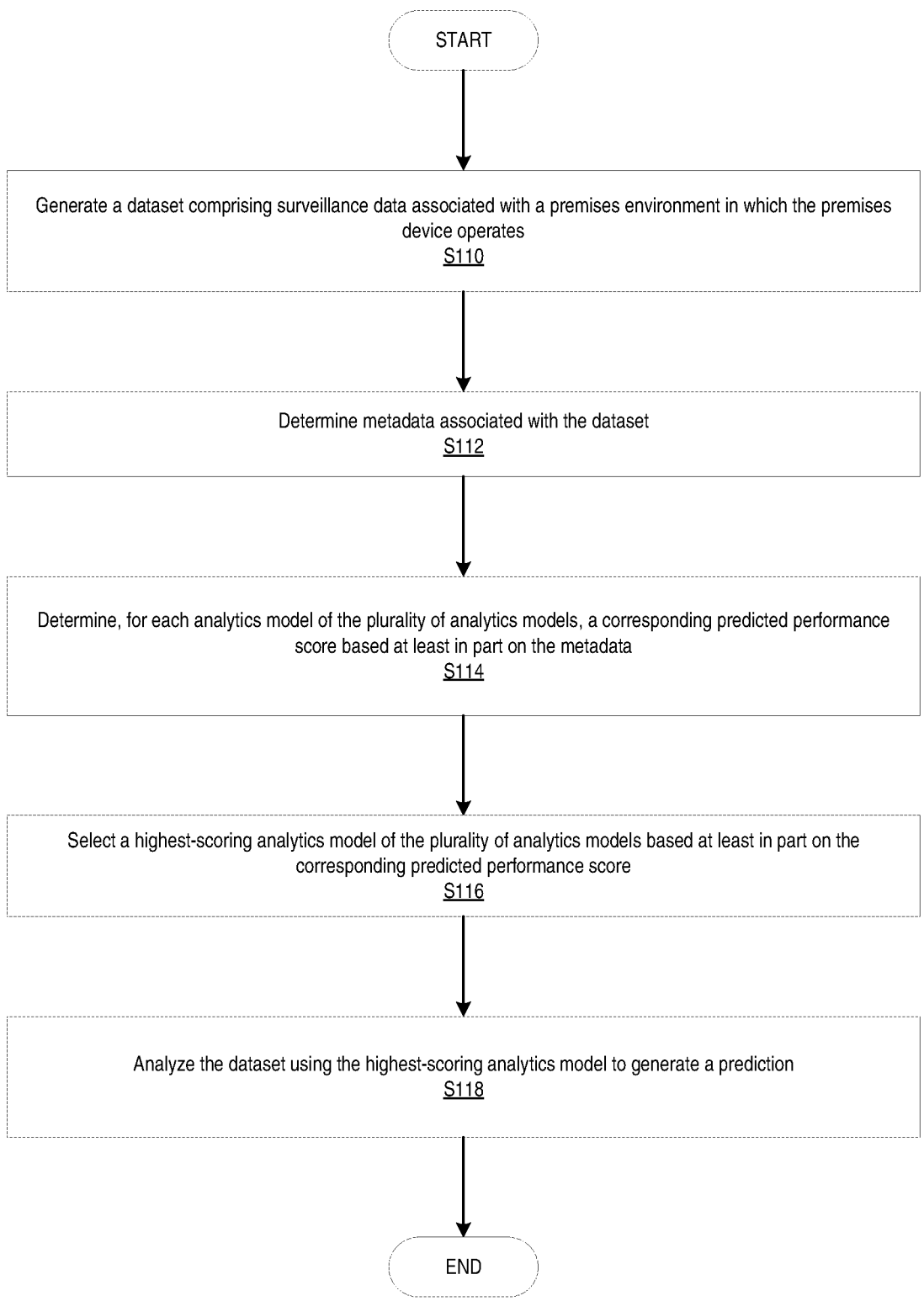
FIG. 4 is a flowchart of another example process performed in the premises monitoring system of FIG. 1.

FIG. 4 is a flowchart of an example process of premises device 18 according to some embodiments of the present disclosure. One or more blocks described herein may be performed by one or more elements of premises device 18, such as by one or more of processing circuitry 36 (including the edge analytics unit 24) and/or processor 38 and/or communication interface 34. Premises device is configured with (e.g., stores in memory 40 and/or receives from system control device 16 and/or remote monitoring environment 20) a plurality of analytics models.

Premises device 18 (such as via processing circuitry 36 and/or a plurality of instructions stored in memory 40 which, when executed by the processor 38 and/or processing circuitry 36, are configured to cause the processor 38 and/or processing circuitry to perform one or more of the following steps or functions) is configured to generate (Block S110) a dataset comprising at surveillance data associated with an environment in which the premises device 18 operates. Premises device 18 is configured to determine (Block S112) metadata associated with the dataset. Premises device 18 is configured to determine (Block S114), for each analytics model of the plurality of analytics models, a corresponding predicted performance score based at least in part on the metadata. Premises device 18 is configured to select (Block S116) a highest-scoring analytics model of the plurality of analytics models based at least in part on the corresponding predicted performance score.

Premises device 18 is configured to analyze (Block S118) the dataset using the highest-scoring analytics model to generate a prediction. For example, where the highest-scoring analytics model is an ML model, the dataset, or a portion thereof (e.g., a sampling, a slice, etc.) is input into the ML model. In some cases, the dataset may be preprocessed, reformatted, sampled, flattened, etc., to enable the ML model to process the dataset. In some embodiments, the output of the ML model may be a prediction which is used locally to perform some premises device 18 action (e.g., sounding an alarm, entering into a heightened alert state, powering on, waking up, signaling other premises devices 18 to wake up, etc.). In some embodiments, the output of the ML model may be a prediction which is transmitted to another element in system 10, e.g., system control device 16 and/or remote monitoring environment 20, enabling the other element to take further action based on the prediction. In some embodiments, any of the above steps may be performed alternatively by one or more of premises devices 18, system control device 16, and/or remote monitoring environment 20.

According to one or more embodiments, the prediction comprises a predicted likelihood of at least one of a security breach in the premises environment, a crime event in the premises environment, a fire event in the premises environment, a flood event in the premises environment, a health emergency event in the premises environment, or an equipment malfunction event in the premises environment.

According to one or more embodiments, the metadata comprises device information which comprises at least one of a model of the premises device 18, a type of the premises device 18, a sensor resolution of the premises device 18, a frame rate of the premises device 18, a processing capability of the premises device 18, a temperature of the premises device 18, or a power level of the premises device 18.

According to one or more embodiments, the metadata comprises environment information which comprises at least one of a visibility condition of the premises environment, a temperature of the premises environment, a humidity level of the premises environment, a weather condition of the premises environment, a location of the premises device in the premises environment, or a time of day associated with the dataset.

According to one or more embodiments, premises device 18 is further configured to determine, for each analytics model of the plurality of analytics models, the corresponding predicted performance score by receiving an historical dataset comprising historical premises device data and a plurality of corresponding labels, receiving (or, in some embodiments, determining) a metadata dataset associated with the historical premises device data, determining, for each analytics model of the plurality of analytics models, a plurality of accuracy scores based at least in part on the historical premises device data, the plurality of corresponding labels, and the metadata dataset, where each of the plurality of accuracy scores is associated with a datapoint in the metadata dataset, and generating, for each analytics model of the plurality of analytics models, a data structure comprising the metadata dataset and the associated plurality of accuracy scores.

According to one or more embodiments, the historical premises device data and corresponding labels are determined in at least one of a simulated testing environment, or a prior deployment of the premises device 18.

According to one or more embodiments, premises device 18 is further configured to receive, from at least one of a system control device 16 and a remote monitoring environment 20, a data structure comprising a plurality of predicted performance scores, where each predicted performance score of the plurality of predicted performance scores is associated with a corresponding analytics model of the plurality of analytics models and a corresponding set of metadata. In such embodiments, the determining, for each analytics model of the plurality of analytics models, of the corresponding predicted performance score is further based at least in part on the data structure. For example, the data structure may correspond to Table 1 and Table 2, described below.

Some embodiments of the present disclosure may support analytics which evaluate various criteria and/or metadata and selectively apply one or more analytic model (e.g., ML models, statistical models, AI models, etc.) to data collected by system 10. The criteria/metadata may include, for example, information regarding the source of the data, the environment, or other information. For example, where the source of data is a premises device 18 which is a surveillance camera, the metadata and/or conditions may include information about the premises device 18, such as a model or type of the camera, a processing capability of the premises device 18, a power level of the premises device 18, etc., and/or may include information about the environment in which premises device 18 is located, such as temperature, weather, time of day, visibility conditions, location of the camera (e.g., relative to other elements of system 10 and/or its location in premises 14), etc.

In some embodiments, prior to deploying an analytic model, the analytic model may be evaluated under various conditions. In some embodiments, various conditions may be simulated in a testing environment, for example, for evaluation purposes. In some embodiments, historical data may be used to evaluate the analytic.

For example, a first set of conditions may be applied, simulated, and/or analyzed to determine a performance score of a first analytic model under the first set of conditions. The performance scores may correspond to a variety of metrics, such as number of true positives, true negatives, false positives, false negatives, average processing speed, amount of computing resources required, or other performance metrics. A second set of conditions may be applied to the first analytic model to determine performance of the first analytic model under the second set of conditions. The first analytic model may be deployed and/or simulated in one or more premises devices 18 (and/or system control devices 16 and/or remote monitoring environment 20).

As an example, a variety of video surveillance premises devices 18 may be analyzed (e.g., by edge analytics unit 24, system analytics unit 26, and/or remote analytics unit 28) using the first analytics model under a variety of conditions (a first set of conditions, a second set of conditions, a third set of conditions, etc.). The video surveillance premises devices 18 may be analyzed (e.g., by edge analytics unit 24, system analytics unit 26, and/or remote analytics unit 28) using the second analytics model under a variety of conditions (a first set of conditions, a second set of conditions, a third set of conditions, etc.).

Table 1 below illustrates a hypothetical example testing configuration for determining performance of a first analytics model (Person-Detecting Video Analytic Version 1) for a variety of video surveillance premises devices 18.

TABLE 1

Hypothetical Performance Evaluation for
Person-Detecting Video Analytic Version 1

| Camera Model | Temperature (° F.) | Weather | Performance Score |
|---|---|---|---|
| ... | | | |
| A123 | 70 | Clear | 95 |
| A123 | 80 | Clear | 95 |
| A123 | 90 | Clear | 80 |
| ... | | | |
| A123 | 80 | Foggy | 72 |
| A123 | 80 | Heavy Rain | 70 |
| A123 | 80 | Light Rain | 81 |
| ... | | | |
| B987 | 70 | Clear | 78 |
| B987 | 80 | Clear | 78 |
| B987 | 90 | Clear | 80 |
| ... | | | |
| B987 | 80 | Foggy | 92 |
| B987 | 80 | Heavy Rain | 90 |
| B987 | 80 | Light Rain | 91 |

Table 2 below illustrates a hypothetical example testing configuration for determining performance of a second analytics model (Person-Detecting Video Analytic Version 2) for a variety of video surveillance premises devices 18.

TABLE 2

Hypothetical Performance Evaluation for
Person-Detecting Video Analytic Version 2

| Camera Model | Temperature (° F.) | Weather | Performance Score |
|---|---|---|---|
| ... | | | |
| A123 | 70 | Clear | 82 |
| A123 | 80 | Clear | 83 |
| A123 | 90 | Clear | 81 |
| ... | | | |
| A123 | 80 | Foggy | 81 |
| A123 | 80 | Heavy Rain | 80 |
| A123 | 80 | Light Rain | 87 |
| ... | | | |
| B987 | 70 | Clear | 86 |
| B987 | 80 | Clear | 88 |
| B987 | 90 | Clear | 90 |
| ... | | | |
| B987 | 80 | Foggy | 72 |
| B987 | 80 | Heavy Rain | 70 |
| B987 | 80 | Light Rain | 71 |

In the example of Table 1, a variety of video surveillance premises devices 18 which have different camera models (e.g., model "A123", "B987", etc.) are tested under various sets of conditions (here, only temperature and weather are shown, but a variety of other conditions may also be included). A performance score is determined for each of the camera models using the first analytic model. The first analytic model may be configured to run in one or more of premises device 18, system control device 16, and/or remote monitoring environment 20. The performance score may be determined in one or more of premises device 18, system control device 16, and/or remote monitoring environment 20.

In the example of Table 2, a variety of video surveillance premises devices 18 which have different camera models (e.g., model "A123", "B987", etc.) are tested under various sets of conditions (here, only temperature and weather are shown, but a variety of other conditions may also be included). A performance score is determined for each of the camera models using the second analytic model. The second analytic model may be configured to run in one or more of premises device 18, system control device 16, and/or remote monitoring environment 20. The performance score may be determined in one or more of premises device 18, system control device 16, and/or remote monitoring environment 20.

In various embodiments, a device or element in system 10 that uses an analytics model is operating, the system 10 and/or device and/or element (e.g., premises device 18, system control device 16, and/or remote monitoring environment 20) may be configured to periodically determine the conditions or other metadata associated with the system 10 and/or data sources (e.g., conditions and/or metadata associated with premises device 18, system control device 16, and/or remote monitoring environment 20). Premises device 18, system control device 16, and/or remote monitoring environment 20 may be configured to selectively apply the particular analytic(s) having the highest performance score for the given set of conditions and/or metadata. For example, in the performance evaluations shown in Tables 1 and 2, if the conditions/metadata are Camera Model=A123, Temperature=70° F., and Weather=clear, premises device 18, system control device 16, and/or remote monitoring environment 20 may be configured to selectively apply Person-Detecting Video Analytic Version 1 over Person-Detecting Video Analytic Version 2, as in the example, the performance score for Version 1 is higher than Version 2 for the given set of conditions/metadata. In some embodiments, selectively applying Person-Detecting Video Analytics Version 1 may correspond to determining a first set of conditions associated with one or more of premises device 18, system control device 16, and/or remote monitoring environment 20, then deploying, storing, downloading, running, configuring, etc., a first ML model with a first set of parameters, layers, biases, etc., rather than second ML model with a different set of parameters, layers, biases, etc., in one or more of premises device 18, system control device 16, and/or remote monitoring environment 20, where the selective application of the ML model is based on the performance score of Person-Detecting Video Analytics Version 1 (i.e., the first ML model) being higher than the performance score of Person-Detecting Video Analytics Version 2 (i.e., the second ML model) under the current set of conditions. Other types of analytics (e.g., statistical models, Bayesian networks, AI models, etc.) may be used, and the analytics models of the present disclosure are not limited to ML models.

For example, in some embodiments, information/metadata regarding conditions may be provided, collected, and/or determined when the system 10 is deployed in premises 14. For example, the model, location, etc. of a video surveillance camera premises device 18, etc. may be provided and/or determined when installed/deployed in the premises 14.

Information for other conditions can be determined based at least in part on metadata associated with the data on which the analytics operates. For example, a video file generated by premises device 18 may include metadata indicating the camera model, resolution, lens, encoding, etc., which may be determined and/or associated with the data by one or more of premises device 18, system control device 16, and/or remote monitoring environment 20.

In some embodiments, information for various conditions may be obtained from other sensor premises devices 18 in the system. For example, a temperature or humidity sensor premises device 18 may provide temperature and humidity information, which may be used by one or more of premises device 18, system control device 16, and/or remote monitoring environment 20 to associate metadata with the video surveillance data collected by a premises device 18.

In some embodiments, information for various conditions may be obtained from external and/or third-party sources. For example, weather data may be obtained through application programming interface (API) calls to the National Weather Service's system, or similar databases, services, etc.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system comprising:
   at least one processor; and
   at least one non-transitory computer-readable medium storing a plurality of instructions that, when executed by the at least one processor, cause the at least one processor to:
   receive a video dataset from a premises device;
   determine metadata associated with the video dataset, the metadata comprising at least one of:
   device information associated with the premises device; or
   environment information associated with an environment in which the premises device operates;
   determine, for each analytics model of a plurality of analytics models, a corresponding score indicating a hypothetical performance evaluation of the analytic model for the video dataset based at least in part on the metadata;
   select a highest-scoring analytics model of the plurality of analytics models based at least in part on the corresponding score; and
   after the highest-scoring analytic model has been selected, input the video dataset into the highest-scoring analytics model to analyze the video dataset for generating a prediction.

2. The system of claim 1, wherein the prediction comprises a predicted likelihood of at least one of:
   a security breach in the environment;
   a crime event in the environment;
   a fire event in the environment;
   a flood event in the environment;
   a health emergency event in the environment; or
   an equipment malfunction event in the environment.

3. The system of claim 1, wherein the metadata comprises the device information, the device information comprising at least one of:
   a model of the premises device;
   a type of the premises device;
   a sensor resolution of the premises device;
   a frame rate of the premises device;
   a processing capability of the premises device;
   a temperature of the premises device; or
   a power level of the premises device.

4. The system of claim 1, wherein the metadata comprises the environment information, the environment information comprising at least one of:
   a visibility condition of the environment;
   a temperature of the environment;
   a humidity level of the environment;
   a weather condition of the environment;
   a location of the premises device in the environment; or
   a time of day associated with the video dataset.

5. The system of claim 1, wherein the plurality of instructions are further configured to cause the at least one processor to determine, for each analytics model of the plurality of analytics models, the corresponding score by at least:
   receiving an historical dataset comprising historical premises device data and a plurality of corresponding labels;
   receiving a metadata dataset associated with the historical premises device data;
   determining, for each analytics model of the plurality of analytics models, a plurality of accuracy scores based at least in part on the historical premises device data, the plurality of corresponding labels, and the metadata dataset, each of the plurality of accuracy scores being associated with a datapoint in the metadata dataset; and
   generating, for each analytics model of the plurality of analytics models, a data structure comprising the metadata dataset and the plurality of accuracy scores.

6. The system of claim 5, wherein the historical premises device data and corresponding labels are determined in at least one of
   a simulated testing environment; or
   a prior deployment of the premises device.

7. A video surveillance premises device configured to operate in a premises monitoring system, the video surveillance premises device being configured with a plurality of analytics models, the video surveillance premises device comprising:
   at least one processor; and
   at least one non-transitory computer-readable medium comprising a plurality of instructions that, when executed by the at least one processor, causes the at least one processor to:
      generate a video dataset comprising surveillance data associated with a premises environment in which the video surveillance premises device operates;
      determine metadata associated with the video dataset;
      determine, for each analytics model of the plurality of analytics models, a corresponding score indicating a hypothetical performance evaluation of the analytic model for the video dataset based at least in part on the metadata;
      select a highest-scoring analytics model of the plurality of analytics models based at least in part on the corresponding score; and
      after the highest-scoring analytic model has been selected, input the video dataset into the highest-scoring analytics model to analyze the video dataset for generating a prediction.

8. The video surveillance premises device of claim 7, wherein the prediction comprises a predicted likelihood of at least one of:
   a security breach in the premises environment;
   a crime event in the premises environment;
   a fire event in the premises environment;
   a flood event in the premises environment;
   a health emergency event in the premises environment; or
   an equipment malfunction event in the premises environment.

9. The video surveillance premises device of claim 7, wherein the metadata comprises device information, the device information comprising at least one of:
   a model of the video surveillance premises device;
   a type of the video surveillance premises device;
   a sensor resolution of the video surveillance premises device;
   a frame rate of the video surveillance premises device;
   a processing capability of the video surveillance premises device;
   a temperature of the video surveillance premises device; or
   a power level of the video surveillance premises device.

10. The video surveillance premises device of claim 7, wherein the metadata comprises environment information, the environment information comprising at least one of:
   a visibility condition of the premises environment;
   a temperature of the premises environment;
   a humidity level of the premises environment;
   a weather condition of the premises environment;
   a location of the video surveillance premises device in the premises environment; or
   a time of day associated with the video dataset.

11. The video surveillance premises device of claim 7, wherein the plurality of instructions are further configured to cause the at least one processor to determine, for each analytics model of the plurality of analytics models, the corresponding score by at least:
   receiving an historical dataset comprising historical premises device data and a plurality of corresponding labels;
   receiving a metadata dataset associated with the historical premises device data;
   determining, for each analytics model of the plurality of analytics models, a plurality of accuracy scores based at least in part on the historical premises device data, the plurality of corresponding labels, and the metadata dataset, each of the plurality of accuracy scores being associated with a datapoint in the metadata dataset; and
   generating, for each analytics model of the plurality of analytics models, a data structure comprising the metadata dataset and the plurality of accuracy scores.

12. The video surveillance premises device of claim 11, wherein the historical premises device data and corresponding labels are determined in at least one of
   a simulated testing environment; or
   a prior deployment of the video surveillance premises device.

13. The video surveillance premises device of claim 7, wherein the plurality of instructions are further configured to cause the at least one processor to receive, from at least one of a system control device and a remote monitoring environment, a data structure comprising a plurality of scores, each score of the plurality of scores:
- being associated with a corresponding analytics model of the plurality of analytics models and a corresponding set of metadata; and
- indicating a predicted performance of the corresponding analytic model of the plurality of analytics models; and
- the determining, for each analytics model of the plurality of analytics models, of the corresponding score being further based at least in part on the data structure.

14. A method in a video surveillance premises device, the video surveillance premises device being configured to operate in a premises monitoring system, the video surveillance premises device being configured with a plurality of analytics models, the method comprising:
- generating a video dataset comprising surveillance data associated with a premises environment in which the video surveillance premises device operates;
- determining metadata associated with the video dataset;
- determining, for each analytics model of the plurality of analytics models, a corresponding score indicating a hypothetical performance evaluation of the analytic model for the video dataset based at least in part on the metadata;
- selecting a highest-scoring analytics model of the plurality of analytics models based at least in part on the corresponding score; and
- after the highest-scoring analytic model is selected, inputting the video dataset into the highest-scoring analytics model to analyze the video dataset for generating a prediction.

15. The method of claim 14, wherein the prediction comprises a predicted likelihood of at least one of:
- a security breach in the premises environment;
- a crime event in the premises environment;
- a fire event in the premises environment;
- a flood event in the premises environment;
- a health emergency event in the premises environment; or
- an equipment malfunction event in the premises environment.

16. The method of claim 14, wherein the metadata comprises device information, the device information comprising at least one of:
- a model of the video surveillance premises device;
- a type of the video surveillance premises device;
- a sensor resolution of the video surveillance premises device;
- a frame rate of the video surveillance premises device;
- a processing capability of the video surveillance premises device;
- a temperature of the video surveillance premises device; or
- a power level of the video surveillance premises device.

17. The method of claim 14, wherein the metadata comprises environment information, the environment information comprising at least one of:
- a visibility condition of the premises environment;
- a temperature of the premises environment;
- a humidity level of the premises environment;
- a weather condition of the premises environment;
- a location of the video surveillance premises device in the premises environment; and
- a time of day associated with the video dataset.

18. The method of claim 14, further comprising determining, for each analytics model of the plurality of analytics models, the corresponding score by at least:
- receiving an historical dataset comprising historical premises device data and a plurality of corresponding labels;
- receiving a metadata dataset associated with the historical premises device data;
- determining, for each analytics model of the plurality of analytics models, a plurality of accuracy scores based at least in part on the historical premises device data, the plurality of corresponding labels, and the metadata dataset, each of the plurality of accuracy scores being associated with a datapoint in the metadata dataset; and
- generating, for each analytics model of the plurality of analytics models, a data structure comprising the metadata dataset and the plurality of accuracy scores.

19. The method of claim 18, wherein the historical premises device data and corresponding labels are determined in at least one of
- a simulated testing environment; or
- a prior deployment of the video surveillance premises device.

20. The method of claim 14, further comprising receiving, from at least one of a system control device and a remote monitoring environment, a data structure comprising a plurality of scores, each score of the plurality of scores:
- being associated with a corresponding analytics model of the plurality of analytics models and a corresponding set of metadata; and
- indicating a predicted performance of the corresponding analytic model of the plurality of analytics models; and
- the determining, for each analytics model of the plurality of analytics models, of the corresponding score being further based at least in part on the data structure.

* * * * *